United States Patent [19]

Ito et al.

[11] Patent Number: 5,266,876
[45] Date of Patent: Nov. 30, 1993

[54] NUMERICAL CONTROL APPARATUS HAVING A MACHINING PROGRAM EDITING FUNCTION FOR NUMERICAL CONTROL MACHINE TOOL

[75] Inventors: Kenji Ito; Masato Ryoki, both of Niwa, Japan

[73] Assignee: Okuma Corporation, Aichi, Japan

[21] Appl. No.: 813,016

[22] Filed: Dec. 24, 1991

[30] Foreign Application Priority Data

Dec. 28, 1990 [JP] Japan .................. 2-419006

[51] Int. Cl.$^5$ .................. G05B 13/00; G06F 15/46
[52] U.S. Cl. .................. 318/568.24; 318/568.11; 364/474.24; 364/474.25
[58] Field of Search .................. 318/560–646; 364/474.01–474.32, 191–193, 161–171

[56] References Cited

U.S. PATENT DOCUMENTS

| | | | |
|---|---|---|---|
| 4,135,239 | 1/1979 | Hamill et al. | 318/514 |
| 4,328,448 | 5/1982 | Berenberg et al. | 318/561 |
| 4,580,207 | 4/1986 | Arai et al. | 364/474 |
| 4,635,185 | 1/1987 | Kishi et al. | 364/191 |
| 4,669,041 | 5/1987 | Kishi et al. | 318/568 X |
| 4,794,514 | 12/1988 | Hideaki et al. | 318/568 X |
| 4,978,901 | 12/1990 | Hirai | 318/600 |
| 5,051,676 | 9/1991 | Seki et al. | 318/568.2 X |
| 5,068,585 | 11/1991 | Kuchiki | 318/569 |
| 5,099,432 | 3/1992 | Fukaya et al. | 364/474.25 |
| 5,115,400 | 5/1992 | Watanabe et al. | 364/474.24 |
| 5,172,327 | 12/1992 | Miyata et al. | 364/474.21 |

Primary Examiner—Paul Ip
Attorney, Agent, or Firm—Wenderoth, Lind & Ponack

[57] ABSTRACT

A machining program for controlling a numerical control machine tool is edited by a machining program editing function of a numerical control apparatus. Machining step division codes and machining step identification codes are input, and machining step unit programs are defined by dividing the machining program on the basis of machining step division blocks. Machining step identification codes are extracted for each of the machining step unit programs and are defined as the machining step names of the machining step unit programs. The machining step names are displayed on a screen according to the sequence of the execution of the machining step programs. Locations of the machining step names are changed according to externally input commands. The sequence of the execution of the machining programs is converted according to the thus changed locations of the machining step names.

4 Claims, 20 Drawing Sheets

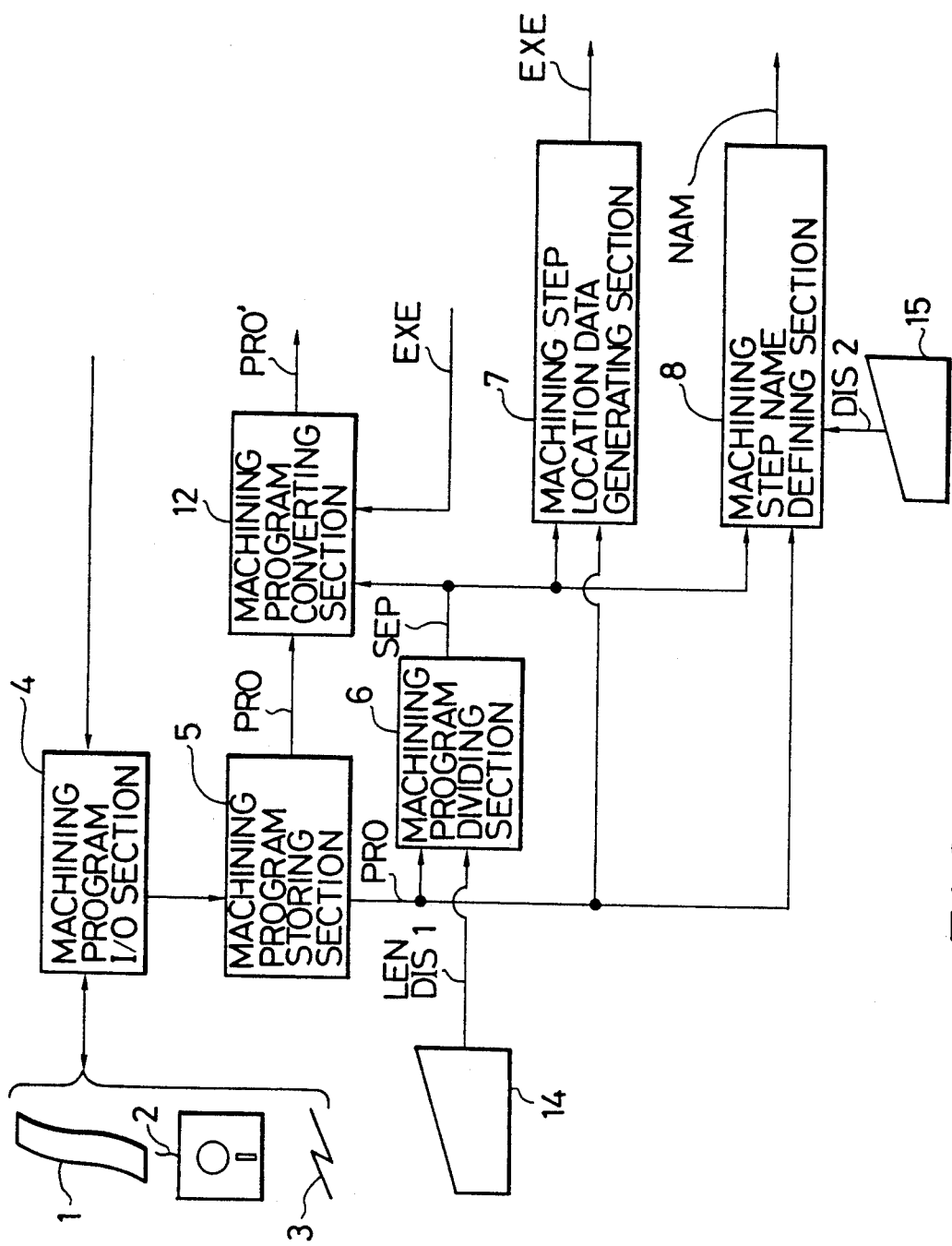
F I G. 8A

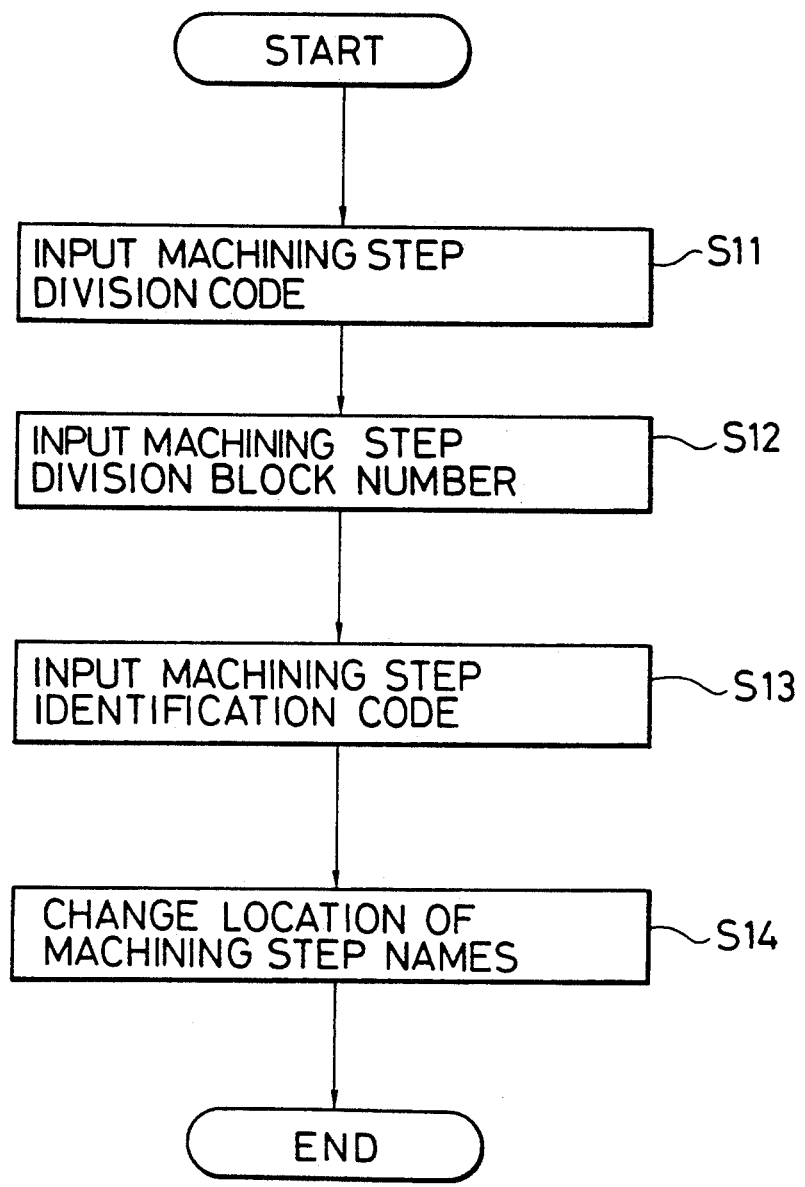
F I G. 9

*PROGRAM EDITION*

| | FIRST HEADSTOCK | | SECOND HEADSTOCK | |
|---|---|---|---|---|
| FIRST TOOL REST | SECOND TOOL REST | FIRST TOOL REST | SECOND TOOL REST | |
| 1: T010101 | | | 5: T010101 | |
| 2: T020202 | | | 6: T020202 | |
| 3: T030303 | | | | |
| 4: T040404 | | | | |
| ■ | | | | |

MACHINING STEP DIVISION CODE ＝ TOOL CHANGE COMMAND
MACHINING STEP DIVISION BLOCK NUMBER ＝ 3
MACHINING STEP IDENTIFICATION CODE ＝ TOOL CHANGE COMMAND

F I G. 10

※ PROGRAM EDITION ※

| FIRST HEADSTOCK | | SECOND HEADSTOCK | |
|---|---|---|---|
| FIRST TOOL REST | SECOND TOOL REST | FIRST TOOL REST | SECOND TOOL REST |
| 3 T030303 | 1 T010101 | | 5 T010101 |
| 2 T020202 | | | 6 T020202 |
| 4 T040404 | | | |

MACHINING STEP
DIVISION CODE ══ TOOL CHANGE COMMAND

MACHINING STEP
DIVISION BLOCK NUMBER ══ 3

MACHINING STEP
IDENTIFICATION CODE ══ TOOL CHANGE COMMAND

F I G. 11

NUMERICAL CONTROL APPARATUS HAVING A MACHINING PROGRAM EDITING FUNCTION FOR NUMERICAL CONTROL MACHINE TOOL

BACKGROUND OF THE INVENTION

1. Field of the Invention

The present invention relates to a numerical control apparatus having a machining program editing function for numerical control machine tools.

2. Description of the Related Art

Machining operations of numerical control machine tools are performed according to machining programs which, in general, are in the form of one or more consecutive machining step unit programs PUT (i) each defining the operation at one machining step. In the case of numerical control machine tools each having one headstock and tool rest, it is possible to change the sequence of the execution of machining programs by rearranging the above machining step unit programs PUT (i).

The manner of changing the sequence of the execution of a machining program will be described for the case of the numerical control machine tools having a plurality of headstocks or a plurality of tool rests. As numerical control machine tools having a plurality of the headstocks or a plurality of the tool rests, 2-saddle machine tools having one headstock and two tool rests which are aimed for improving processing efficiency by means of simultaneous machining, and 2-spindle machine tools having two headstocks and at least one tool rest which are aimed for improving machining's efficiency by means of integral machining, have been proposed.

The machining operation is carried out by controlling the relative movement of the headstocks and the tool rests. As to the numerical control machine tools having a plurality of the headstocks or a plurality of tool rests, there is a plurality of combinations of the headstocks and the tool rests which can perform machining operations and, therefore, such numerical control machine tools generally have a plurality of control processes each configurated so as to be able to independently perform operations to control the headstocks and the tool rests.

A machining step unit program PUT (i) of such numerical control machine tools consists of a control process definition command TRC (i) and a spindle operation command PRC (i). The control process definition command TRC (i) defines the control process which is related to the contents of the spindle operation command PRC (i) which has been given thereafter.

As to the control process specified by the control process definition command TRC (i), the control process specified by the previous control process definition command TRC (i) is effective until a new control process is defined, and the defined state is kept in the subsequent spindle operation command PRC (i). The spindle operation command PRC (i) includes a spindle transfer command and, if necessary, spindle rotation speed commands RPM (i), spindle rotation command ROT (i), tool change command TOL (i), and synchronization command SYN (i). At the beginning of the blocks of the control process definition command TRC (i) and the spindle operation command PRC (i), labels LAB are commanded. The synchronization command SYN (i) is given to provide synchronization of spindle operation command PRC (i) between different control processes in order to perform simultaneous machining, or to define the sequence of the execution of the spindle operation command PRC (i) between control processes which can not be executed in parallel.

FIG. 1 is a schematic diagram showing an example of the numerical control machine tools having a plurality of headstocks or a plurality of tool rests, which is equipped with two headstocks and two tool rests. The two headstocks are disposed on both sides of a machine body 2-1 so as to face each other, and a first headstock 2-2 and a second headstock 2-3 are supported so as to be movable in the directions of a Z1-axis and a Z2-axis, respectively. Spindles 2-2a and 2-3a are supported by the headstocks 2-2 and 2-3 with a common axis of rotation CT1. In addition, chucks 2-2b and 2-3b are mounted on the ends of the spindles 2-2a and 2-3a, respectively. The chucks 2-2b and 2-3b hold work pieces 2-4 and 2-5, respectively.

The two tool rests are disposed so as to sandwitch the axis of rotation CT1. The first tool rest 2-6 is supported so as to be movable in the direction of an X1-axis while the second tool rest 2-7 is disposed so as to be movable in the directions of a Z3-axis and a X2-axis. Turrets 2-6a and 2-7a which are formed like a polygonal tube, are mounted on the tool rests 2-6 and 2-7, respectively, and cutting tools 2-8 and 2-9 are mounted on the turrets 2-6a and 2-7a, respectively.

With the configuration as described above, after the work 2-4 undergoes a front step machining on the first headstock 2-2, it is transferred from the first headstock 2-2 to the second headstock 2-3 by which it is held to receive a back step machining. In other words, the work 2-5 is a work on which the front step machining has been completed.

In this example, there are four combinations of the headstocks and the tool rests with which machining can be carried out and, therefore, four control processes for respective combinations are considered and the control process definition commands TRC (i) for respective control processes are given as follows.

G13=a first control process (the combination of the first headstock and the first tool rest)
G14=a second control process (the combination of the first headstock and the second tool rest)
G15=a third control process (the combination of the second headstock and the first tool rest)
G16=a fourth control process (the combination of the second headstock and the second tool rest)

Simultaneous machining of the front and back step machinings can be carried out by a parallel operation of the first and second control processes and a parallel operation of the third and fourth control processes. Synchronization commands SYN (i) defining such parallel operations are given as follows.

P (**)=performing synchronization with a control process which does not share the tool rest
: figure Rule for the synchronization: Blocks including a synchronization command SYN (i) can not be executed when the figure shown in P () is greater than the figure shown in the P (**) of a process to control the object to which synchronization is to be achieved.

Further, a parallel operation of the first and third operations and a parallel operation of the second and fourth operations can not be carried out because those operations share the same tool rest. Synchronization command SYN (i) which sequences such operations is expressed as:

Q ()=performing synchronization with a control process which shares the tool rest. : figure Rule for the synchronization: Blocks including a synchronization command SYN (i) can not be executed when the figure shown in Q () is greater than the figure shown in the Q () of a process to control the object to which synchronization is to be achieved.

Though the control process definition command is expressed by a G-code and the synchronization command is expressed by a P- and a Q-code here, other codes may be used.

FIG. 2 shows an example of a machining method wherein the front and back step machinings are defined as independent machinings in the above-mentioned numerical control machine tool with the axis of abscissa representing machining time and wherein the front step machining comprises machining steps from a first machining step to a fourth machining step and the back step machining comprises fifth and sixth machining steps. The machining program PRO of the machining shown in FIG. 2 is in a configuration wherein machining step unit programs PUT (1) to PUT (6) defining the operation of the machinings from the first machining step to the sixth machining step are consecutively provided as shown in FIG. 3.

TRC (1)=G13
TRC (2)=G13
TRC (3)=G13
TRC (4)=G16
TRC (5)=G16
TRC (6)=G16

Since a control machining definition command TRC (i) is held until a new control process is defined, the control process definition commands TRC (2), TRC (3), TRC (4) and TRC (6) may be deleted. Further, since the machining shown in FIG. 2 includes neither simultaneous machining steps nor machining steps which share the tool rest, no synchronization command SYN (i) is issued. P Since there is a great difference (T2-T1) in the machining time between the machining time T2 for the front step machining and the machining time T1 for the back step machining, it is necessary to shorten the machining time of the front step machining so as to achieve an efficient balance between the cycles of the tool rests in order to carry out the machining efficiently. If the first and third machining steps can be carried out simultaneously, it is necessary to carry out the first and third machining steps simultaneously as shown in FIG. 6 while correcting the sequence of the execution of the machining program so that the back step machining (fifth and sixth machining steps) are started immediately after the completion of the first machining step.

FIG. 4 is a flow chart illustrating the procedure for the correction of the execution sequence of the machining program, and FIG. 5 shows a display device and an input device of a numerical control device, which are the means for the above correction. The machining program is displayed on a screen 12-1 and a cursor 12-6 is moved to a top block of a machining step unit program to be moved by operating a page key 12-4 and a cursor key 12-3 (Step S1) to cut the machining step unit program (Step S2). The cursor 12-6 is then moved to the block to which the cut machining step unit program is to be moved (Step S3) and the cut machining step unit program is inserted therein (Step S4). The above Steps S1 to S4 are carried out for each machining step unit program to be moved (Step S5). The cutting and insertion of the machining step unit programs as described above can be carried out by pressing a function key 12-5.

Similarly, correction of a control process definition command or a synchronization command is carried out by moving the cursor 12-6 to the location to be corrected by operating the page key 12-4 and the cursor key 12-3, and by inputting characters and numerals with the keyboard 12-2 directly (Steps S6 to S9). The above Steps S6 to S9 are also carried out for each of machining step unit program to be corrected (Step S10).

FIG. 7 shows the machining program PRO' for the machining shown in FIG. 6. In order to form the machining program PRO', it is necessary to make the following correction on the machining program PRO as shown in FIG. 3 when the machining step unit programs of the machining program PRO' are PUT' (1) through PUT' (6).

(1) Replace the machining step unit program units as follows.
PUT (1)→PUT' (2)
PUT (2)→PUT' (3)
PUT (3)→PUT' (1)

(2) Change the control process definition command as follows.
TRC' (2): G13→G14

(3) Set the synchronization commands as follows.
SYN' (1): P (10) Q (10)
SYN' (2): P (10) Q (10)
SYN' (3): P (20) Q (20)
SYN' (4): P (30) Q (30)
SYN' (5): P (20) Q (20)
SYN' (6): P (30) Q (30)

A synchronization command SYN (i) is also held until a new command is given just as a control process definition command TRC (i) and, therefore, it can be deleted as shown below.
SYN' (1): P (10)
SYN' (2): P (10) Q (10)
SYN' (3): P (20)
SYN' (4):
SYN' (5): P (20)
SYN' (6):

In the conventional numerical control apparatus as described above, a very small number of blocks can be displayed on the screen when compared with the total number of the blocks of the machining program. Thus, the page key and the cursor key must be pressed many times to find the locations to be corrected and, in addition, in the case of the numerical control machine tools having a plurality of headstocks or a plurality of tool rests, there is a great burden to operators who must have understanding of control process definition commands and synchronization commands. Moreover, since codes and numerical values must be directly input, a problem arises in that input errors easily occur causing troubles in practical machining operations.

SUMMARY OF THE INVENTION

The present invention has been conceived in view of the above-mentioned situation, and it is the object of the present invention to provide numerical control apparatus having a machining program editing function of numerical control machine tools, which can change the sequence of the execution of machining programs by only changing the locations of machining step names displayed on a screen.

According to one aspect of the present invention, for achieving the objects described above, there is provided a numerical control apparatus having a machining program editing function of numerical control machine tools, comprising a dividing means for dividing machining programs of numerical control machine tools into unit programs each directed to a respective machining step, a defining means for defining machining step names in the machining step unit programs, a display means for arranging the machining step names on a screen according to the sequence of the execution of the machining step unit programs, a changing means for changing the locations of the machining step names according to commands input from the outside, and a converting means for converting the sequence of the execution of the machining programs according to the locations of the machining step names thus changed.

The nature, principle and utility of the invention will become more apparent from the following detailed description when read in conjunction with the accompanying drawings.

BRIEF DESCRIPTION OF THE DRAWINGS

In the accompanying drawings:

FIGS. 8A and 8B are block diagrams to show an example of a numerical control apparatus having a machining program editing function of numerical control machine tools according to the present invention;

FIG. 9 is a flow chart to show an example of the operation of the numerical control apparatus according to the present invention;

FIG. 10 is a view to show an example of a screen display in the numerical control apparatus according to the present invention;

FIG. 11 is a view to show an example of a screen display in the numerical control apparatus according to the present invention;

DESCRIPTION OF THE PREFERRED EMBODIMENT

Figure 8B:
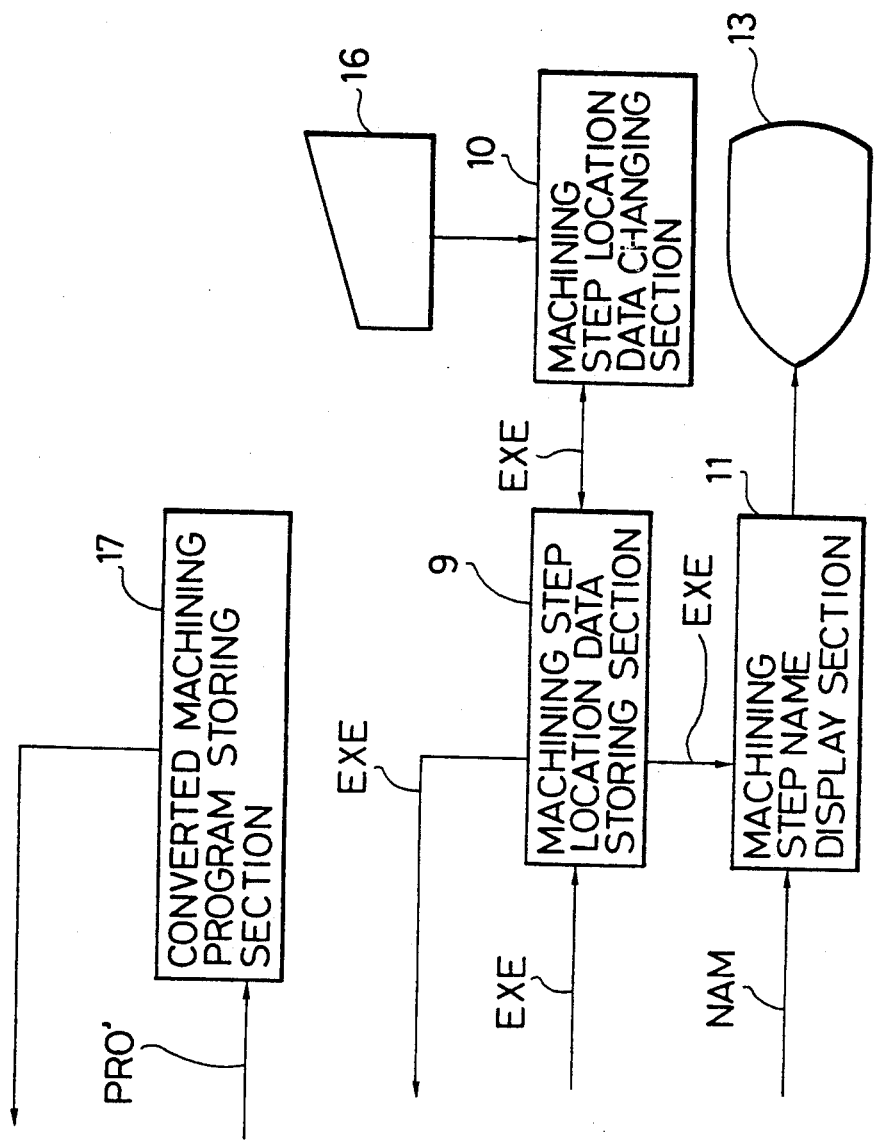

FIGS. 8A and 8B are block diagrams showing an example of a numerical control apparatus having a machining program editing function of numerical control machine tools according to the present invention. A machining program PRO from a paper tape 1, a magnetic disk 2, a communication signal 3 and the like is stored in a machining program storing section 5 through a machining program input/output section 4, and a machining program PRO' stored in a converted machining program storing section 17 are output to the outside in the form of the paper tape 1, a magnetic disk 2, a communication signal 3 and the like through the machining program input/output section 4.

According to a machining step division code DIS1 and a machining step division block number LEN input from an input device 14, the machining program PRO stored in the machining program storing section 5 is divided by a machining program dividing section 6 and machining step division blocks SEP (i) are defined.

Machining step names NAM (i) are defined by a machining step name defining section 8 according to the machining program PRO stored in the machining program storing section 5, the machining step division blocks SEP (i) from the machining program dividing section 6, and machining step identification codes DIS2 input from an input device 15.

According to the machining program PRO stored in the machining program storing section 5 and the machining step division blocks SEP (i) from the machining program dividing section 6, machining step location data EXE (j, k) is set by a machining step location data generating section 7, and the machining step location data EXE (j, k) is stored in a machining step location data storing section 9. According to the machining step location data EXE (j, k) stored in the machining step location data storing section 9, the machining step name NAM (i) which has been sent from the machining step name defining section 8 to a machining step name display section 11, is displayed on a screen 13.

According to a command from an input device 16, the machining step location data EXE (j, k) stored in the machining step location data storing section 9 is changed by a machining step location data changing section 10 and, according to the machining step location data EXE (j, k) and the machining step division block SEP (i) from the machining program dividing section 6, the sequence of the execution of the machining program PRO stored in the machining program storing section 5 is converted by the machining program converting section 12 and the sequence-converted program is stored in the converted machining program storing section 17 as a converted machining program PRO'. The input devices 14, 15 and 16 may be the same input device.

Procedure for editting a machining program in such configuration will now be described with reference to a flow chart in FIG. 9.

An operator inputs a machining step division code in 10-2 on the screen shown in FIG. 10, for example, through a keyboard and the like which are not shown, inputs a machining step division block number in 10-3, and inputs a machining step identification code in 10-4 (Steps S11 to S13). When the input operation is completed, a table 10-5 showing the machining step names is displayed on the screen. A machining step name 10-7 is placed for each control process, and a machining step number 10-6 precedes each machining step name 10-7. The table 10-5 showing the machining step names are in the same arrangement as that for the machining step location data EXE (j, k) and can be displayed by displaying a machining step number i and a machining step name NAM (i) when "EXE (j, k)=i".

Figure 3:
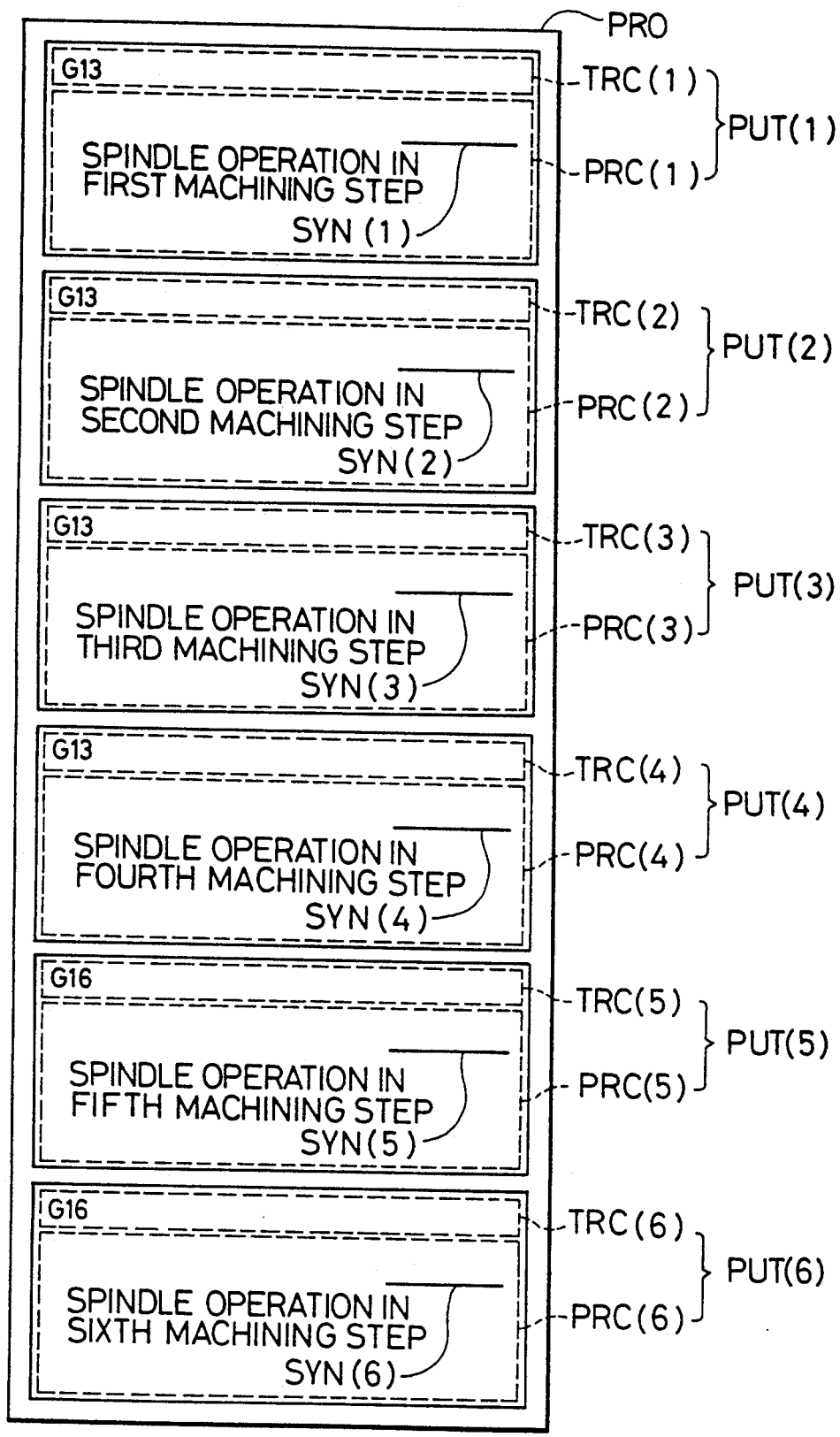
FIG. 3 is a schematic diagram to show an example of the machining program in the machining method of FIG. 2.
Figure 4:
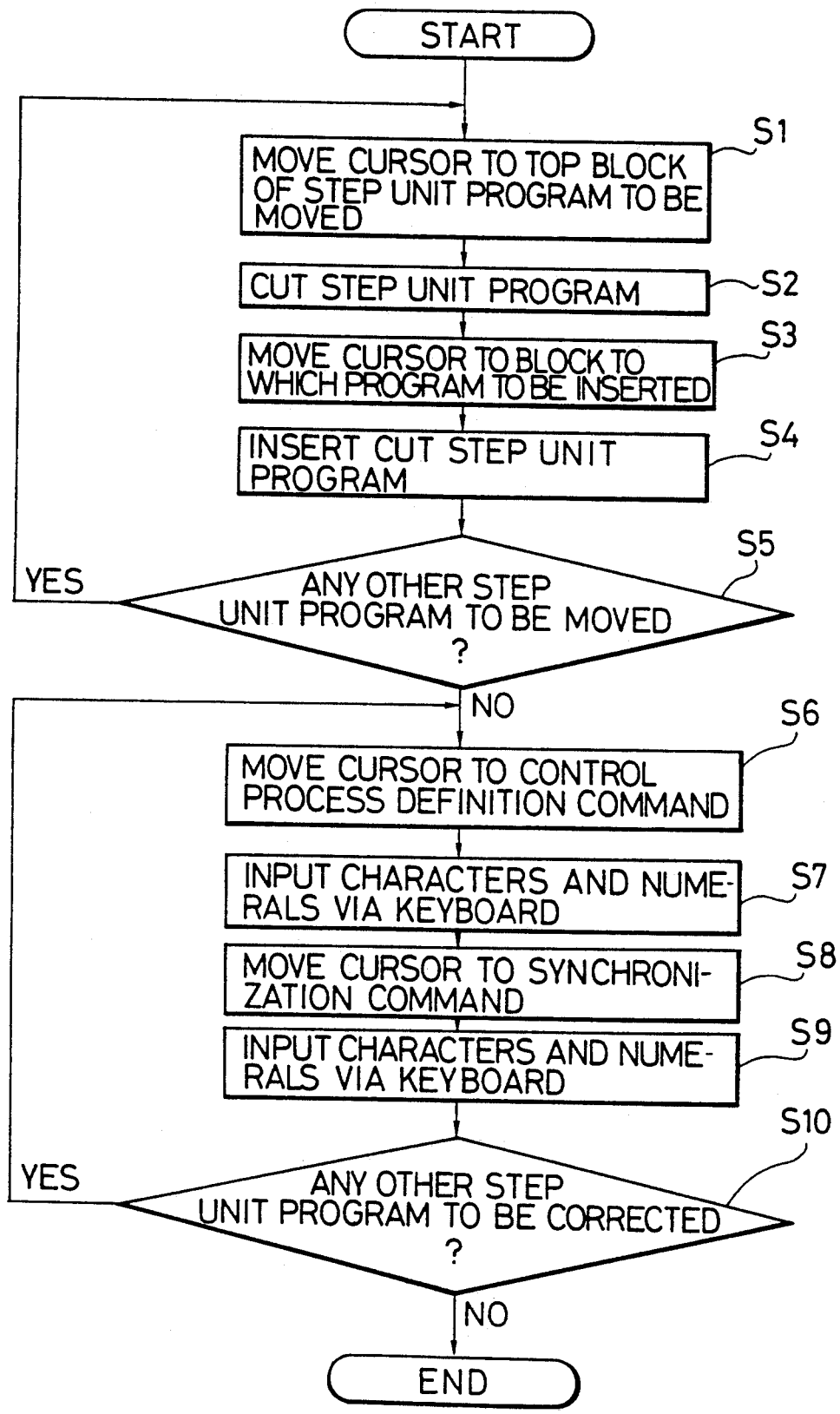
FIG. 4 is a flow chart to show an example of the operation of the correction procedure in conventional machining program edition.
Figure 5:
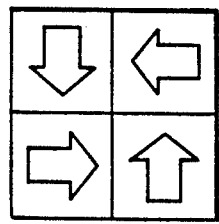
FIG. 5 is a view to show an example of a screen display in the conventional machining program edition.
Figure 5:
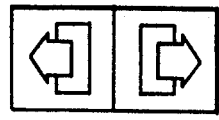
Figure 6:
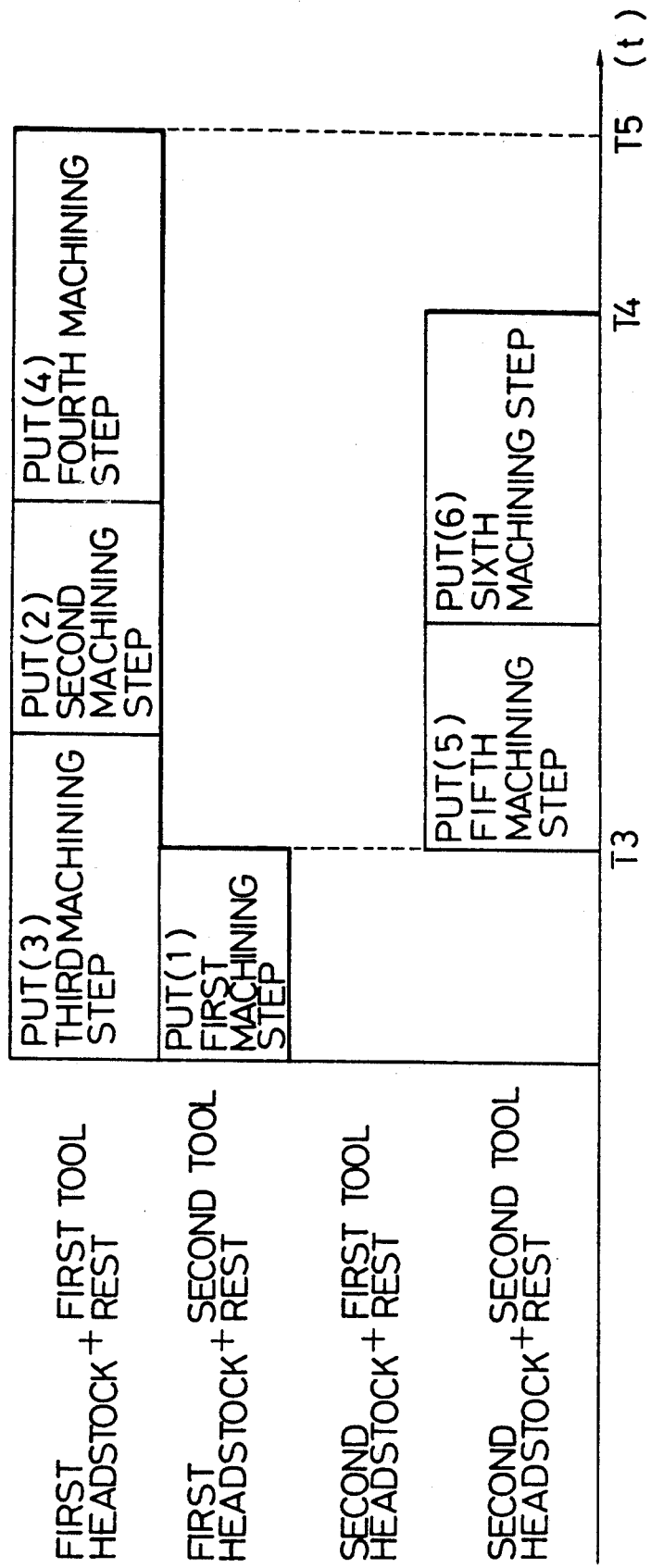
FIG. 6 is an illustration to show the relationship between a machining method and a machining time in another aspect.
Figure 7:
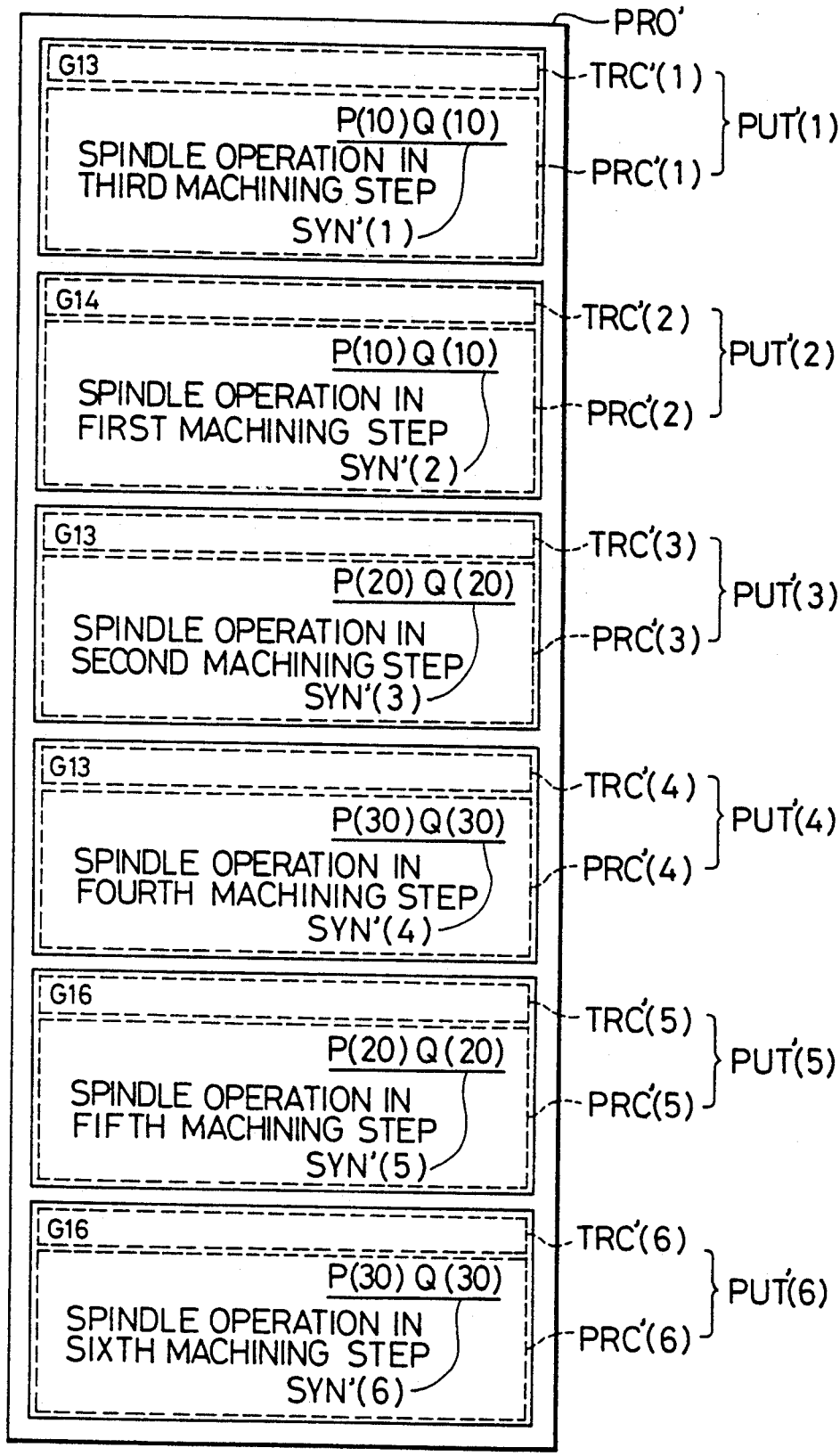
FIG. 7 is a schematic diagram to show an example of the machining program in the machining method of FIG. 6.

Next, the operator moves a machining step name shown on the screen by operating the cursor 10-1 using the keyboard and the like which are not shown (Step S14). For example, if it is desired to change the machining program PRO of FIG. 3 to the machining program PRO' of FIG. 7, the locations of the machining step names are changed from those shown in FIG. 10 to those shown in FIG. 11. When this operation is completed, conversion of the machining program is completed by sending a command through the keyboard and the like which are not shown and this terminates the entire processing.

Figure 12:
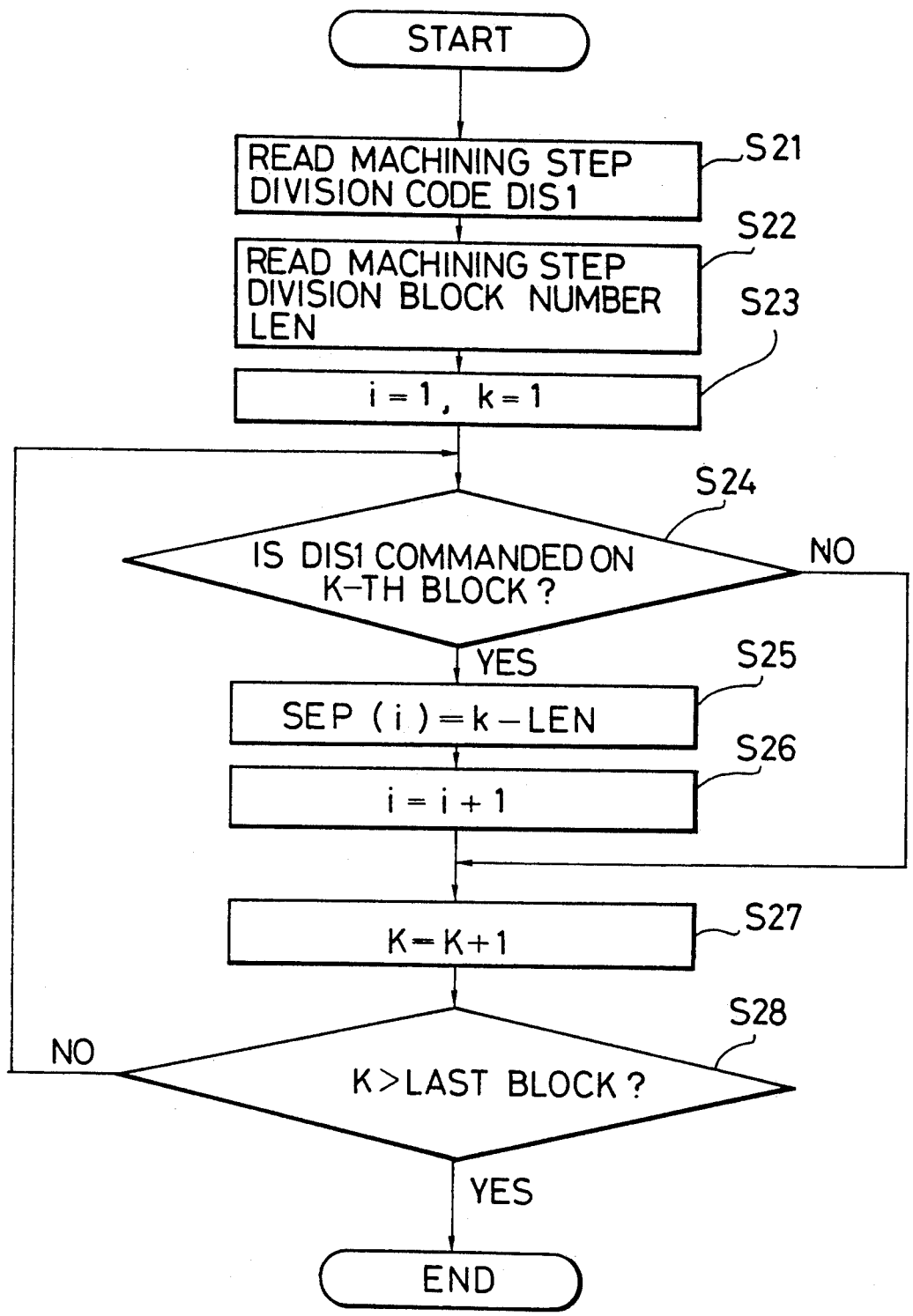
FIG. 12 is a flow chart to show an example of the operations of the numerical control apparatus according to the present invention in detail.
Figure 13:
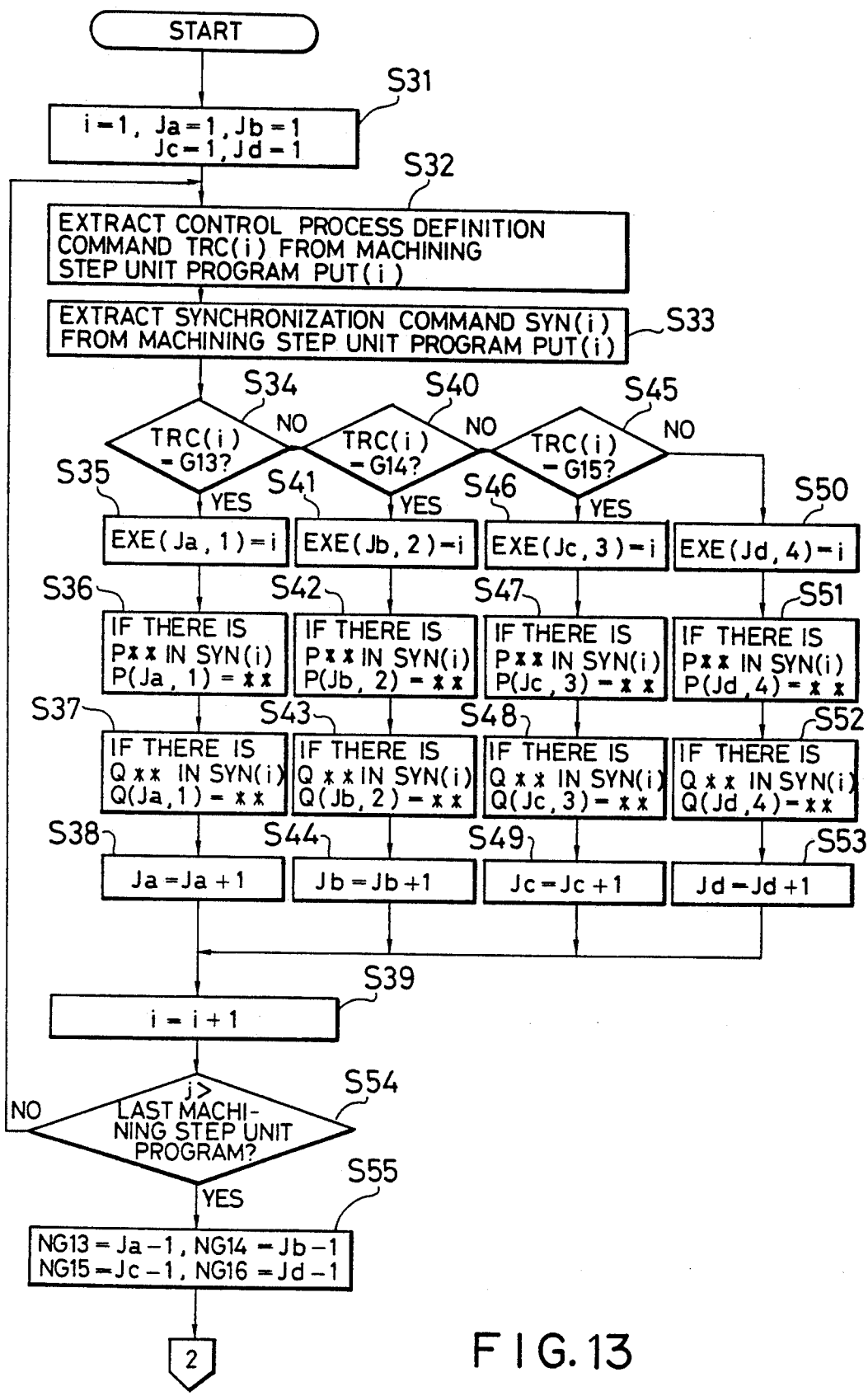
FIG. 13 is a flow chart to show an example of the operations of the numerical control apparatus according to the present invention in detail.
Figure 14:
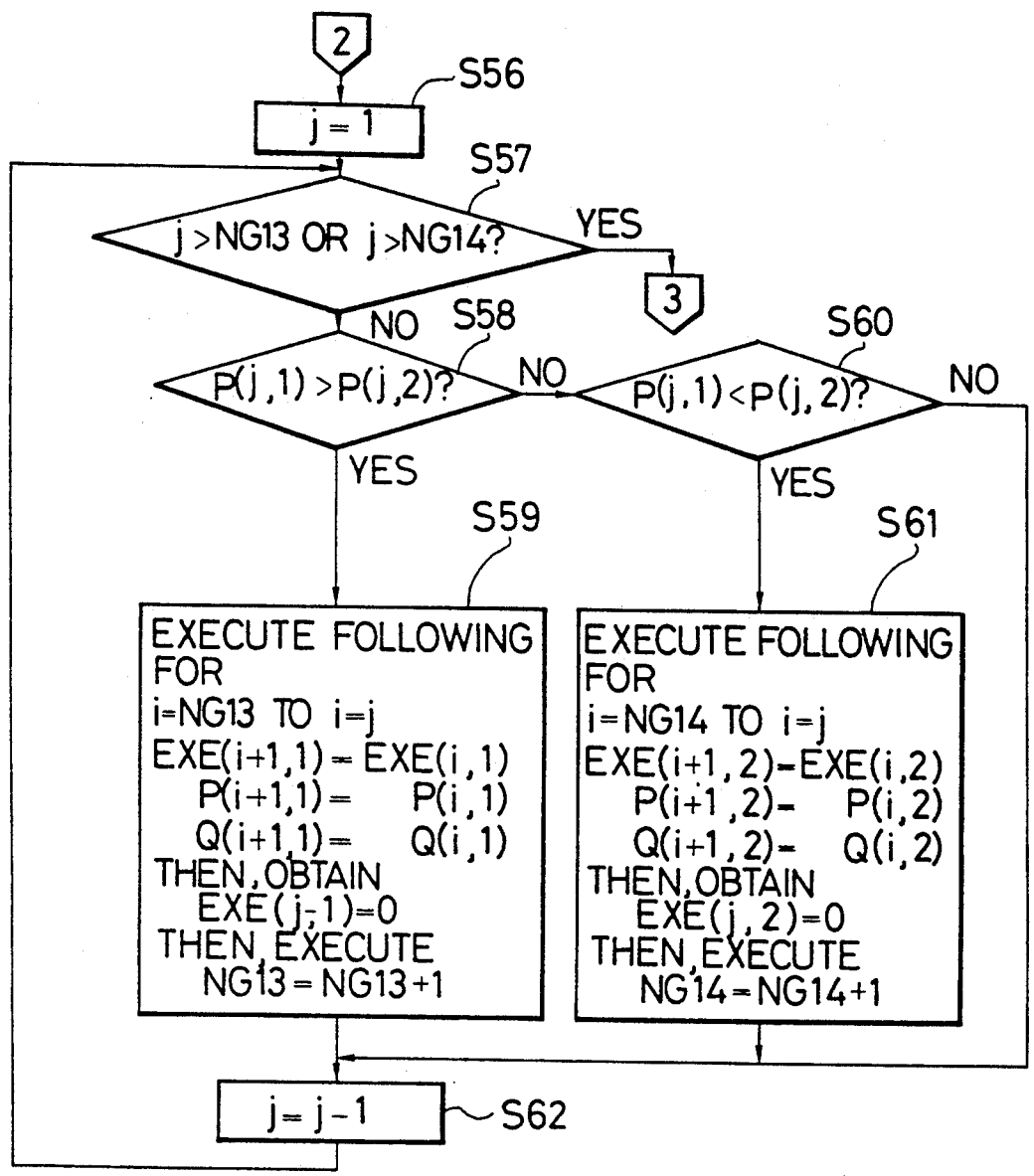
FIG. 14 is a flow chart to show an example of the operations of the numerical control apparatus according to the present invention in detail.
Figure 15:
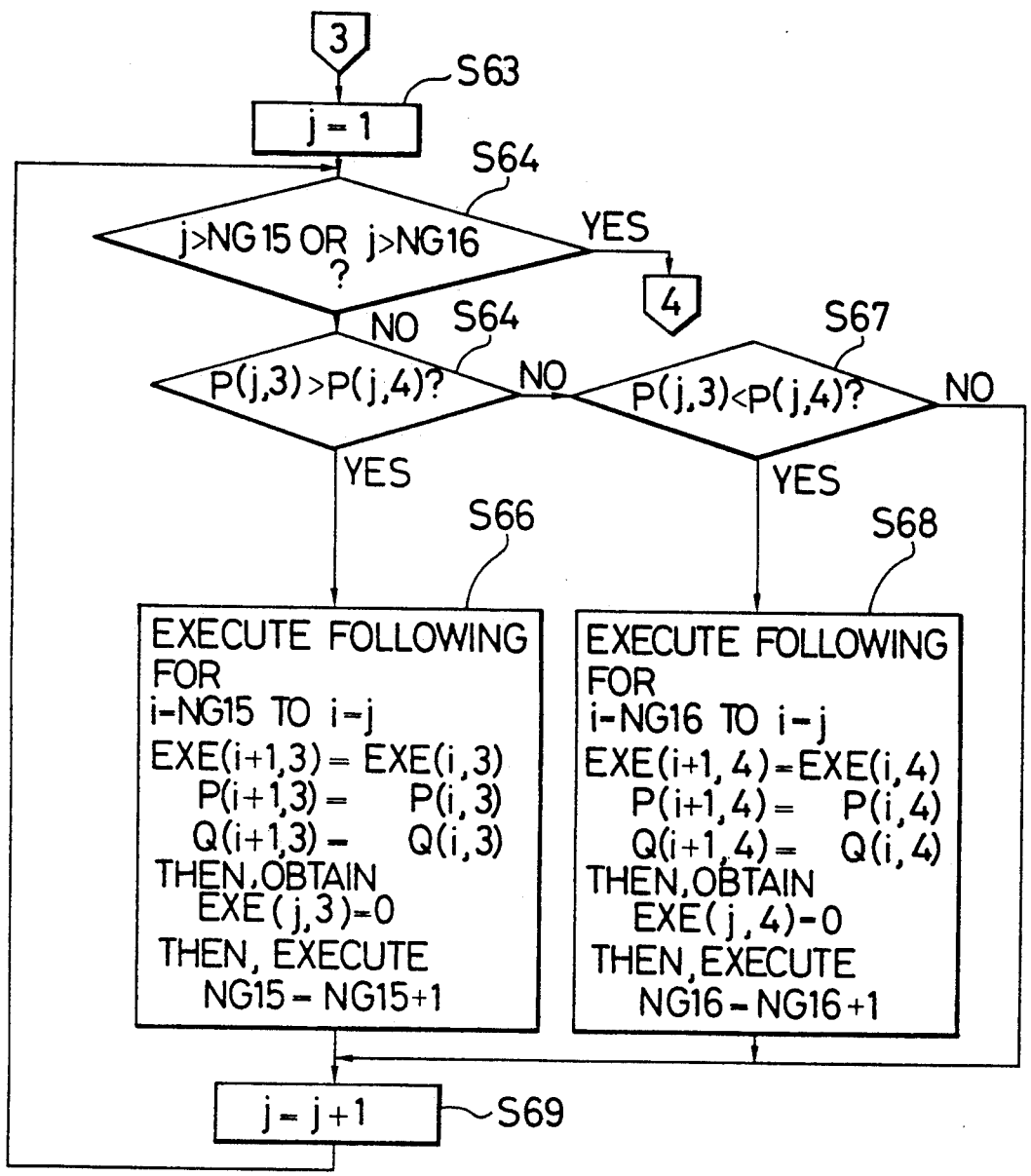
FIG. 15 is a flow chart to show an example of the operations of the numerical control apparatus according to the present invention in detail.
Figure 16:
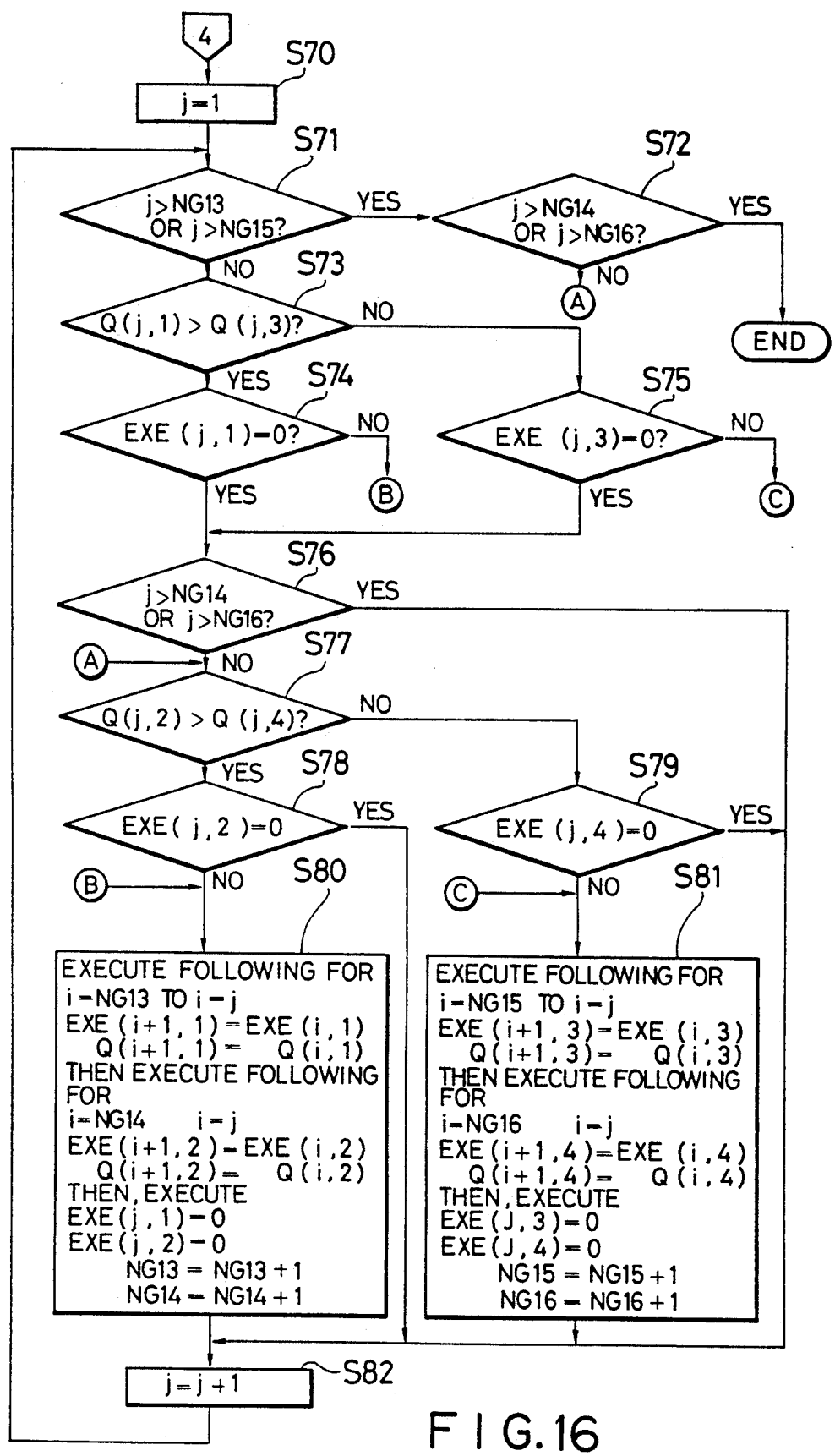
FIG. 16 is a flow chart to show an example of the operations of the numerical control apparatus according to the present invention in detail.

Next, the description will be made with reference to a flow chart shown in FIG. 12 on how to set the machining step division block SEP (i) in which the location of the top block of the machining step unit program PUT (i) in the machining program dividing section 6 are set. The numeral i of the machining step unit program PUT (i) represents the machining step numbers which are given as serial numbers starting with "1" in accordance with the order of the machining step unit program PUT (i) in the machining program.

After the externally input machining step division code DIS1 and the machining step division block number LEN are read (Steps S21 and S22), the machining step number i and a block counter k are initialized (Step S23). It is checked whether the machining step division code DIS1 is not commanded to the k-th block of the machining program (Step S24). When the machining step division code DIS1 is not commanded, the block counter k is updated and the check is repeated (Steps S27, S28 and S24) and, when the machining step division code DIS1 is commanded, the block in positions which are apart from the k-th block by the machining step division block number which is the machining step division block SEP (i) and the machining step number i is updated (Steps S25 and S26). The above Steps are repeated from the first block up to the last block (Step S28) and this terminates the entire processing.

The machining step division block SEP (i) is set as described above. For example, in the case of a machining program in which a tool change command TOL (i) is always in the third block of a machining step unit program PUT (i), a desired machining step unit program PUT (i) is defined by taking the machining step division code DIS1 as the tool change command and the machining step block number LEN as "3". A desired machining step unit program PUT (i) can be defined in any machining program by setting the machining step division code DIS1 and the machining step division number LEN according to the configuration of the machining program.

Next, the description will be made on how to set machining step names NAM (i) in which the machining step names of the machining step unit program PUT (i) in the machining step name defining section 8 are set.

A sequential check is made on the blocks from the (SEP(i))-th block to the (SEP(i+1)−1)-th block from the machining program dividing section 6 to extract a character string corresponding to machining step identification code DIS2, which is to be set as the machining step names NAM (i) of the machining step unit program PUT (i).

Figure 19:
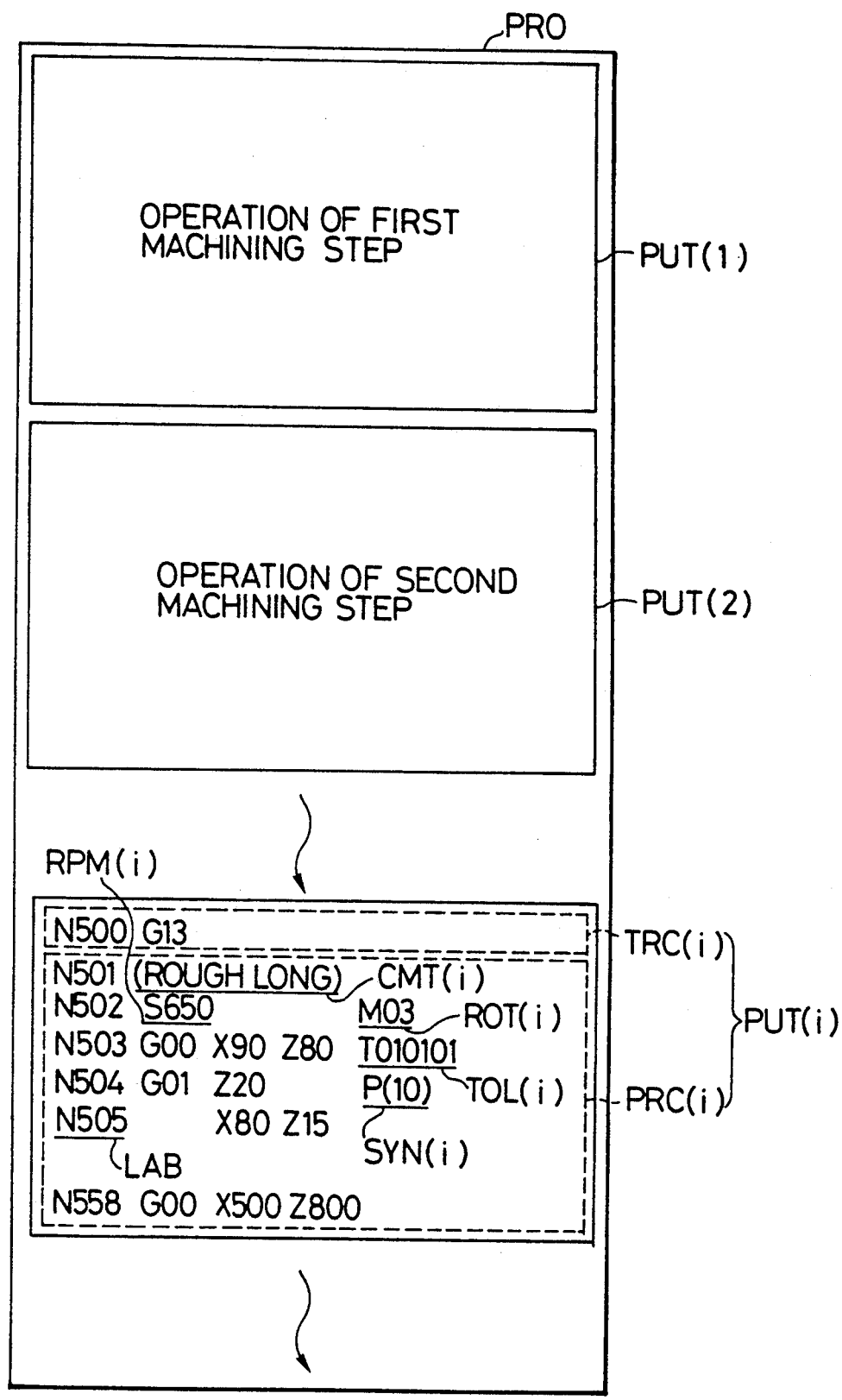
FIG. 19 is a schematic diagram to show an example of the configuration of a machining program.

As an example, the description will now be made on the case wherein the machining step unit program PUT (i) are as shown in FIG. 19.

When an input machining step identification code DIS2 is a tool change command, a tool change command TOL (i) is extracted from the machining step unit program PUT (i), and NAM (i)=TOL (i)="T010101" is set. Similarly, when the tool identification code DIS2 is an spindle rotation speed command RPM (i), NAM (i)=RPM (i)="S650" is set; when the machining step identification code DIS2 is a spindle rotation command ROT (i), NAM (i)=ROT (i)="M03" is set; when the machining step identification code DIS2 is a control process definition command TRC (i), NAM (i)=TRC (i)="G13" is set; when the machining step identification code DIS2 is a comment statement CMT (i), NAM (i)=CMT (i)=(ROUGH LONG) is set; when the machining step identification code DIS2 is a synchronization command SYN (i), NAM (i)=SYN (i)=P (10) is set; and when the machining step identification code DIS2 is a label LAB, NAM (i)=LAB="N500" is set.

Figure 1:
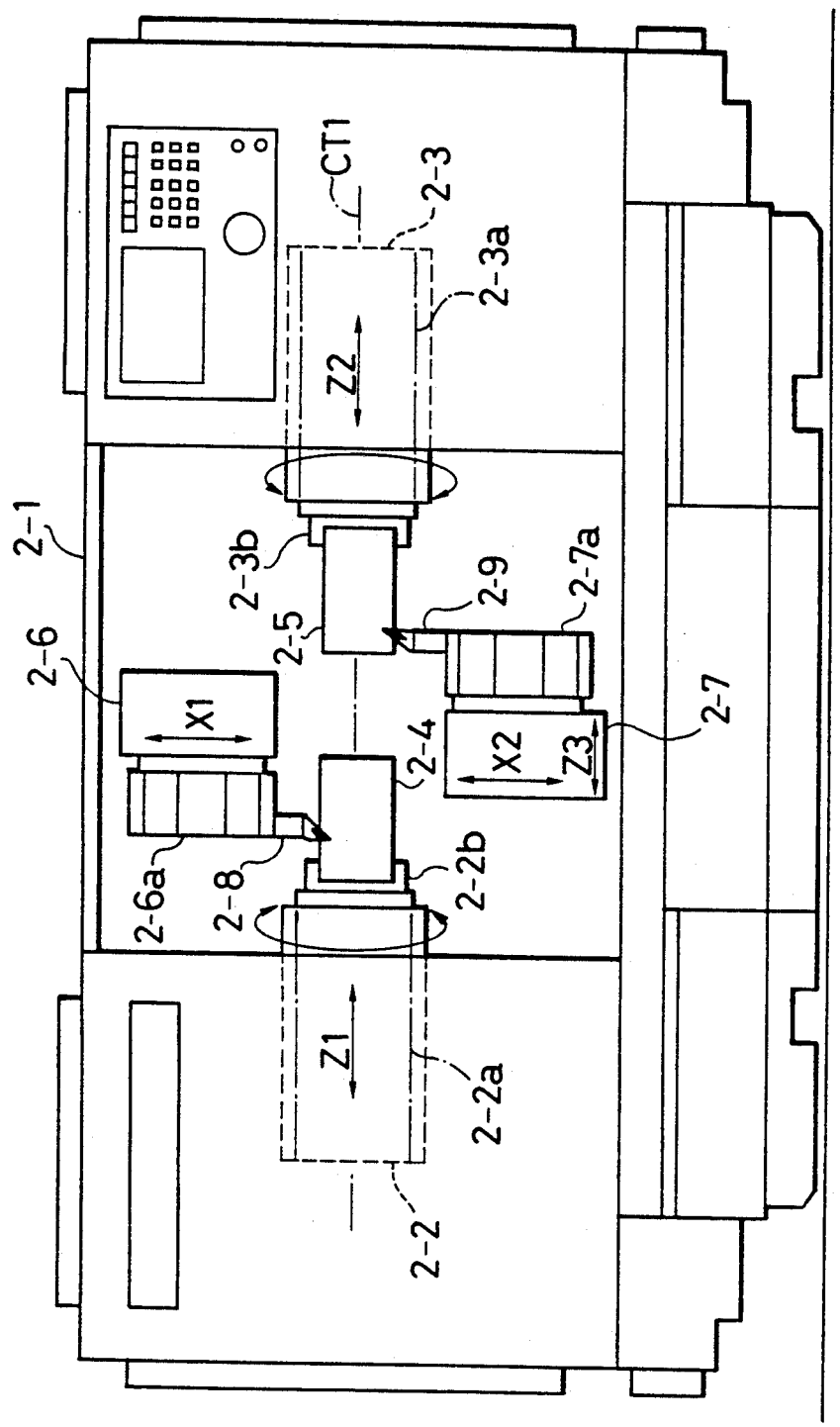
FIG. 1 is a schematic diagram showing an example of a numerical control machine tool having a plurality of headstocks and a plurality of tool rests.
Figure 2:
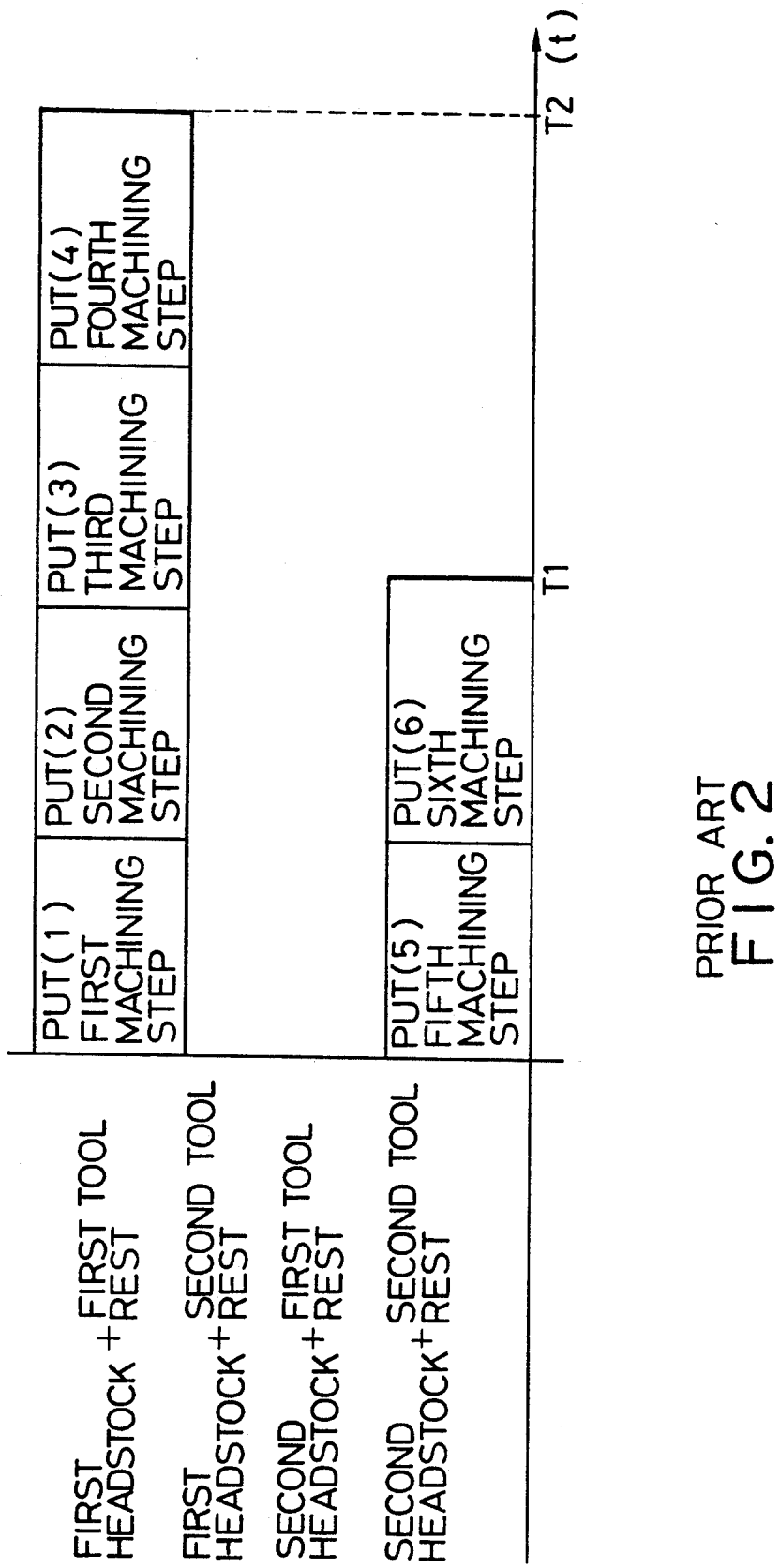
FIG. 2 is an illustration to show the relationship between a machining method and a machining time.

Next, the description will be made with reference to flow charts of FIG. 13 to FIG. 16 on how to set the machining step location data EXE (j, k) of the machining step location data generating section 7, in which the sequence of the execution of the machining step unit program PUT (i) is defined for each control process. If we assume that the i of the machining step unit program PUT (i) is a machining step number and a machining step unit program PUT (i) is executed as j-th action in the k-th control process, the machining step number i is set as EXE (j, k)=i are referred to as a machining sequence counter and a control process counter, respectively. Further, since the numerical control machine tool shown in FIG. 1 has four control processes, EXE (j, k): k=integers from "1" to "4", and, EXE (j, 1): Sequence of the execution of the first control process EXE (j, 2): Sequence of the execution of the second control process EXE (j, 3): Sequence of the execution of the third control process EXE (j, 4): Sequence of the execution of the fourth control process A synchronization command P () of a machining step unit program set in the EXE (j, k) is taken as P (j, k) in which the figures "" of the synchronization command P () are set. Further, a synchronization command Q () of a machining step unit program set in the EXE (j, k) is taken as Q (j, k) in which the figures "" of the synchronization command Q () are set. If the simultaneous machining of a machining step unit program PUT (p) of the first control process and a machining step unit program PUT (q) of the second control process is carried out in the machining sequence counter j, the machining step numbers are set as EXE (j, 1)=p and EXE (j, 2)=q. Similarly, if the simultaneous machining of the step unit program PUT (p) of the third control process and the machining step unit program PUT (q) of the fourth control process is carried out in the machining sequence counter j, the machining step numbers are set as EXE (j, 3)=p and EXE (j, 4)=q. In the case of setting EXE (j, 1)=p and EXE (j+1, 3)=q, for example, between the control processes which can not be operated in parallel because they share the tool rest, after the machining step unit program PUT (p) of the first control process is executed, the machining step unit program PUT (q) of the third control process is executed.

It is illustrated by flow charts shown in FIG. 13 to FIG. 16 that, after machining step numbers are set for the machining step location data EXE (j, k) for each control process at the Steps S31 to S55, the machining step location data EXE (j, k) of the first and second control processes is changed according to a synchronization command P (j, k) at the Steps S56 to S62; similarly, the machining step location data EXE (j, k) of the third and fourth control processes is changed according to a synchronization command P (j, k) at the Steps S63 to S69; and, finally, the machining step location data EXE (j, k) is changed according to a synchronization command Q (j, k) at the Steps S70 to S82.

After the machining step number "i", and machining sequence counters ja, jb, jc and jd are initialized (Step S31), a control process definition command TRC (i) and a synchronization command SYN (i) of the machining step unit program PUT (i) are extracted (Steps S32 and S33). If we assume that the k-th block of the machining program is BLK (k), this method of extraction can be carried out by sequentially checking blocks from BLK (SEP (i)) to BLK (SEP (i+1)−1).

Next, it is checked whether the control process definition command TRC (i) is "G13" or not (Step S34). If the control process definition command TRC (i) is "G13", the machining step number "i" is set in the machining step location data EXE (ja, 1), and the synchronization commands P (ja, 1) and Q (ja, 1) are set (Steps S35, S36 and S37). After the above setting, the machining sequence counter ja is updated (Step S38), and the same step is repeated in the next machining step unit program PUT (i+1) (Steps S39 and S54).

Similarly, if the control process definition command TRC (i) is "G14", the machining step location data EXE (jb, 2), and the synchronization commands P (jb, 2) and Q (jb, 2) are set and the machining counter jb is updated (Steps S40 to S44); if the control process definition command TRC (i) is "G15", the machining step location data EXE (jc, 3), and the synchronization commands P (jc, 3) and Q (jc, 3) are set and the machining counter jc is updated (Steps S45 to S46); and, if the control process definition command TRC (i) is "G16", the machining step location data EXE (jd, 4), and the synchronization commands P (jd, 4) and Q (jd, 4) are set and the machining counter jd is updated (Steps S50 to S53).

When the above Steps S32 to S53 have been executed for all machining step unit programs (Step S54), internal variables NG13, NG14, NG15 and NG16 are set (Step S55). The internal variables NG13, NG14, NG15 and NG16 are values to which the machining sequence counters of the machining step unit programs which is finally executed in respective control processes, are set.

Next, the machining sequence counter j is set to "1" (Step S56), and a synchronization command P (j, 1) of the first control process and a synchronization command P (j, 2) of the second control process are compared to each other in the machining counter j=1. If the synchronization command P (j, 1) of the first control process is greater than the synchronization command P (j, 2) of the second control process (Step S58), the machining step unit programs of the first control process set in the machining step location data EXE (j, 1) must be executed later than the execution of the machining step unit programs of the second control process set in the machining step location data EXE (j, 2) and, therefore, the machining step location data EXE (i, 1), and the synchronization commands P (i, 1) and Q (i, 1) after the machining sequence counter j are moved downward by "1" (i=j to NG13). After this movement, the internal variable N13 is added with "1" to store the downward movement by "1" (Step S59).

On the other hand, if the synchronization command P (j, 1) of the first control process is smaller than the synchronization command P (j, 2) of the second control process (Step S60), the machining step unit programs of the second control process set in the machining step location data EXE (j, 2) must be executed later than the execution of the machining step unit programs of the first control process set in the machining step location data EXE (j, 1) and, therefore, the machining step location data EXE (i, 2), and the synchronization commands P (i, 2) and Q (i, 2) after the machining sequence counter j are moved downward by "1" (i=j to NG14). After this movement, the internal variable NG14 is added with "1" to store the downward movement by "1" (Step S61).

The above Steps S58 to S61 are repeated starting with the machining sequence counter j=1 until either of the machining step unit programs is finished, i.e., until the machining sequence counter j becomes greater than either the internal variables NG13 or NG14 (Steps S62 and S57).

Next, the machining sequence counter j is set to "1" (Step S63), and a synchronization command P (j, 3) of the third control process and a synchronization command P (j, 4) of the fourth control process are compared to each other in the machining counter j=1. If the synchronization command P (j, 3) of the third control process is greater than the synchronization command P (j, 4) of the fourth control process (Step S65), the machining step unit programs of the third control process set in the machining step location data EXE (j, 3) must be executed later than the execution of the machining step unit programs of the fourth control process set in the machining step location data EXE (j, 4) and, therefore, the machining step location data EXE (i, 3), and the synchronization commands P (i, 3) and Q (i, 3) after the machining sequence counter j are moved downward by "1" (i=j to NG15). After this movement, the internal variable NG15 is added with "1" to store the downward movement by "1" (Step S66).

On the other hand, if the synchronization command P (j, 3) of the third control process is smaller than the synchronization command P (j, 4) of the fourth control process (Step S67), the machining step unit programs of the fourth control process set in the machining step location data EXE (j, 4) must be executed later than the execution of the machining step unit programs of the third control process set in the machining step location data EXE (j, 3) and, therefore, the machining step location data EXE (i, 4), and the synchronization commands P (i, 4) and Q (i, 4) after the machining sequence counter j are moved downward by "1" (i=j to NG16). After this movement, the internal variable NG16 is added with "1" to store the downward movement by "1" (Step S68).

The above Steps S65 to S68 are repeated starting with the machining sequence counter j=1 until either of the machining step unit programs is finished, i.e., until the machining sequence counter j becomes greater than either the internal variables NG15 or NG16 (Steps S69 and S64).

Finally, just as the aforesaid method, the machining step location data EXE (i, k) is changed according to the synchronization command Q (j, k). Since the sequence of the execution of the first and second control processes is determined by the Steps S56 to S62, and the sequence of the execution of the third and fourth control processes is determined by the Steps S63 to S69, when it is necessary to change the sequence of execution by the synchronization command Q (j, k), the sequence of the execution must be maintained between the first and second control processes and between the third and fourth processes.

First, the machining sequence counter j is set to "1" (Step S70), and a synchronization command Q (j, 1) of the first control process and a synchronization command Q (j, 3) of the third control process are compared to each other in the machining counter j=1. If the synchronization command Q (j, 1) of the first control process is greater than the synchronization command P (j, 3) of the third control process and the machining step unit programs exist in the machining step location data EXE (j, 1) (Steps S73 and S74), the machining step unit programs of the first control process set in the machining step location data EXE (j, 1) must be executed later than the execution of the machining step unit programs of the third control process set in the machining step location data EXE (j, 3) and, therefore, the machining step location data EXE (i, 1), and the synchronization commands P (i, 1) and Q (i, 1) after the machining sequence counter j are moved downward by "1" (i=j to NG13). Further, in order to maintain the sequence of the execution of the first and second control processes, the machining step location data EXE (i, 2), and the synchronization commands P (i, 2) and Q (i, 2) after the machining sequence counter j are moved downward by "1" for the second control process (i=j to NG14). After this movement, the internal variables NG13 and NG14 are added with "1" to store the downward movement by "1" (Step S80).

On the other hand, if the synchronization command Q (j, 1) of the first control process is smaller than the synchronization command Q (j, 3) of the third control process and machining step unit programs exist in the machining step location data EXE (j, 3) (Steps S73 and S75), the machining step unit programs of the third control process set in the machining step location data EXE (j, 3) must be executed later than the execution of the machining step unit programs of the first control process set in the machining step location data EXE (j, 1) and, therefore, the machining step location data EXE (i, 3), and the synchronization commands P (i, 3) and Q (i, 3) after the machining sequence counter j are moved downward by "1" (i=j to NG15). Further, in order to maintain the sequence of the execution of the third and fourth control processes, the machining step location data EXE (i, 4), and the synchronization commands P (i, 4) and Q (i, 4) after the machining sequence counter j are moved downward by "1" for the second control process (i=j to NG16). After this movement, the internal variables NG15 and NG16 are added with "1" to store the downward movement by "1" (Step S81).

Next, with the machining sequence counter j=1, a synchronization command Q (j, 2) of the second control process and a synchronization command Q (j, 4) of the fourth control process are compared to each other. If the synchronization command Q (j, 2) of the second control process is greater than the synchronization command Q (j, 4) of the fourth control process and the machining step unit programs exist in the machining step location data EXE (j, 2) (Steps S77 and S78), the machining step unit programs of the second control process set in the machining step location data EXE (j, 2) must be executed later than the execution of the machining step unit programs of the fourth control process set in the machining step location data EXE (j, 4) and, therefore, the machining step location data EXE (i, 2), and the synchronization commands P (i, 2) and Q (i, 2) after the machining sequence counter j are moved downward by "1" (i=j to NG14). Further, in order to maintain the sequence of the execution of the first and second control processes, the machining step location data EXE (i, 1), and the synchronization commands P (i, 1) and Q (i, 1) after the machining sequence counter j are moved downward by "1" for the second control process (i=j to NG13). After this movement, the internal variables NG13 and NG14 are added with "1" to store the downward movement by "1" (Step S80).

On the other hand, if the synchronization command P (j, 2) of the second control process is smaller than the synchronization command P (j, 4) of the fourth control process and the machining step unit programs exist in the machining step location data EXE (j, 4) (Steps S77 and S79), the machining step unit programs of the fourth control process set in the machining step location data EXE (j, 4) must be executed later than the execution of the machining step unit programs of the second control process set in the machining step location data EXE (j, 2) and, therefore, the machining step location data EXE (i, 4), and the synchronization commands P (i, 4) and Q (i, 4) after the machining sequence counter j are moved downward by "1" (i=j to NG16). Further, in order to maintain the sequence of the execution of the third and fourth control processes, the machining step location data EXE (i, 3), and the synchronization commands P (i, 3) and Q (i, 3) after the machining sequence counter j are moved downward by "1" for the third control process (i=j to NG15). After this movement, the internal variables NG15 and NG16 are added with "1" to store the downward movement by "1" (Step S81).

The comparison of the synchronization command Q (j, 1) of the first control process and the synchronization command Q (j, 3) of the third control process (machining between the first and third processes) is carried out until either of the machining step unit programs is finished, i.e., until the machining sequence counter j becomes greater than either the internal variable NG13 or NG15 (Step S71). The comparison of the synchronization command Q (j, 2) of the second control process and the synchronization command Q (j, 4) of the fourth control process (machining between the second and fourth processes) is carried out until either of the machining step unit programs is finished, i.e., until the machining sequence counter j becomes greater than either the internal variable NG14 or NG16 (Step S76).

The above Steps are repeated from the machining sequence counter j=1 until both of the processing between the first and third processes and between the second and fourth processes (Step S82).

Figure 17:
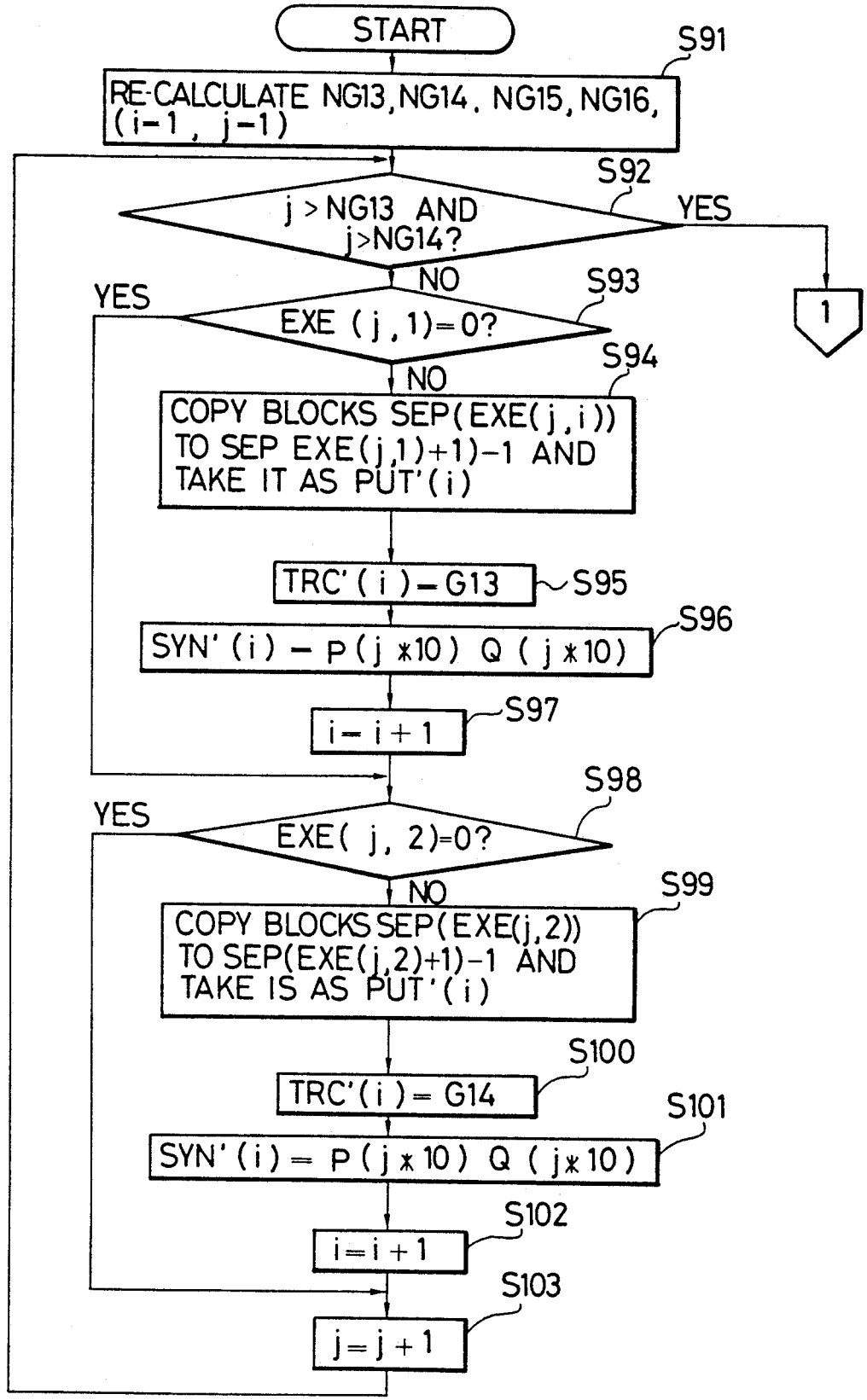
FIG. 17 is a flow chart to show an example of the operations of the numerical control apparatus according to the present invention in detail.
Figure 18:
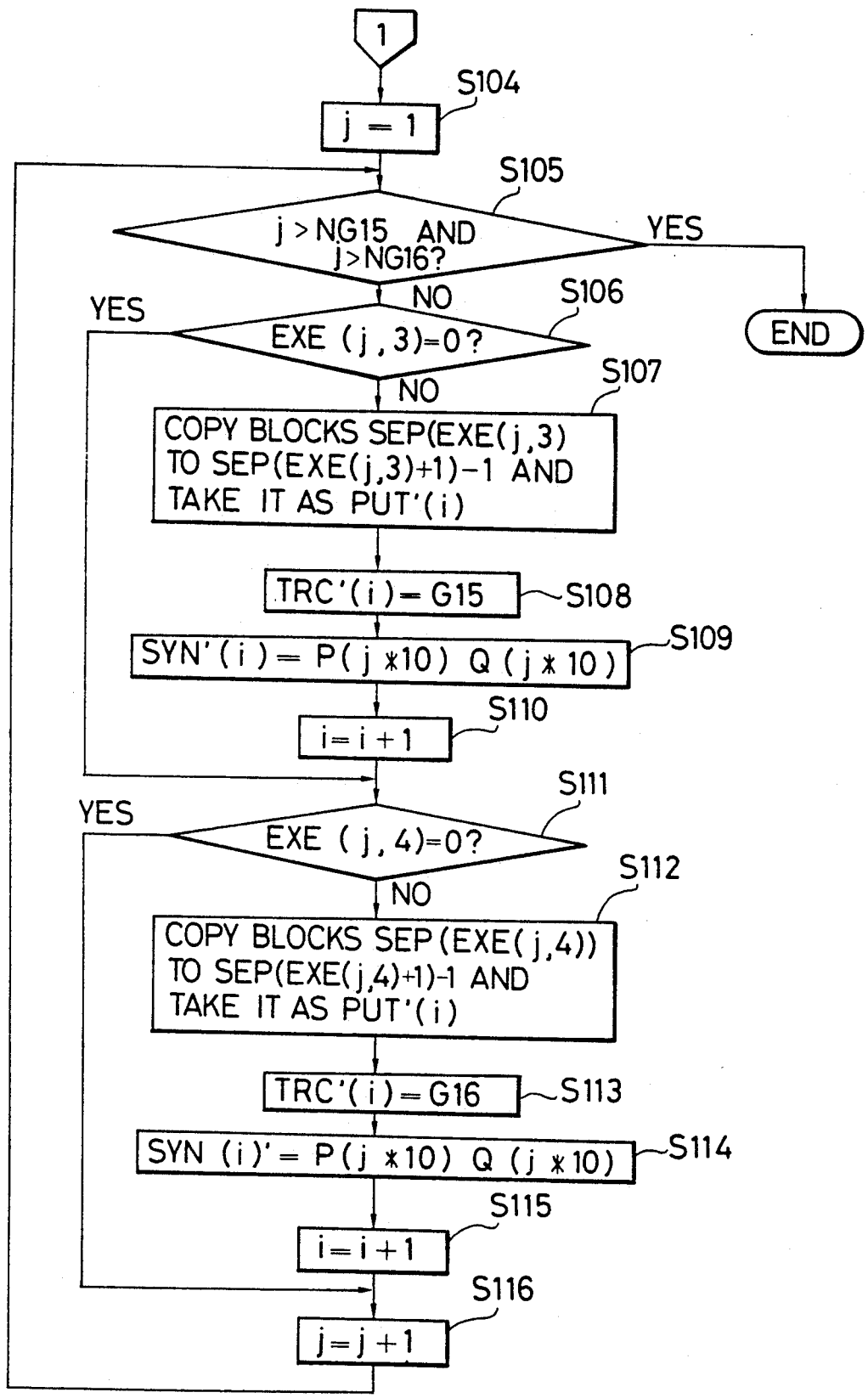
FIG. 18 is a flow chart to show an example of the operations of the numerical control apparatus according to the present invention in detail.

Next, the method of the machining program conversion at the machining program converting section 12 will be described with reference to flow charts in FIG. 17 and FIG. 18. Machining step unit programs of a machining program PRO before the conversion is represented by PUT (i) while the machining step unit programs of the machining program PRO' after the conversion is represented by PUT' (i).

First, since the machining step location data EXE (j, k) has been changed by an external input, the internal variables NG13, NG14, NG15 and NG16 are re-calculated; the machining step number i and the execution sequence counter j are initialized (Step S91); and the following Steps S92 to S103 are repeated until the machining step unit programs are finished, i.e., until the machining sequence counter j exceeds the internal variables NG13 and NG14. If the machining step unit programs exist in the machining step location data EXE (j, 1) of the first control process in the execution sequence counter j (Step S93), the machining step unit programs are copied from the machining program PRO before the conversion and the copied portions will be the machining step unit programs PUT' (i) of the converted machining program PRO' (Step S94). The machining step unit programs PUT (i) in the machining step location data EXE (j, 1) are portions from the SEP (EXE (J, 1))-th block to the (SEP (EXE (j, 1)+1) −1)-th block of the machining program before the conversion. Then, machining process commands TRC' (i) in the machining step unit programs PUT' (i) are specified as "G13", and synchronization commands SYN' (i) are set (Steps S95 and S96). When the machining step unit programs PUT' (i) are created, the machining step number i is added with "1" (Step S97).

Similarly, if the machining step unit programs exist in the machining step location data EXE (j, 2) of the second control process in the execution sequence counter j (Step S98), the machining step unit programs are copied from the machining program PRO before the conversion and the copied portions will be the machining step unit programs PUT' (i) of the converted machining program PRO' (Step S99). The machining step unit programs PUT (i) in the machining step location data EXE (j, 2) are portions from the SEP (EXE (J, 2))-th block to the (SEP (EXE (j, 2)+1)−1)-th block of the machining program before the conversion. Then, the control process commands TRC' (i) in the machining step unit programs PUT' (i) are specified as "G14", and the synchronization commands SYN' (i) are set (Steps S100 and S101). When the machining step unit programs PUT' (i) are formed, the machining step number i is added with "1" (Step S102) while the execution sequence counter j is added with "1" (Step S103).

When the machining step unit programs are finished (Step S92), after re-initializing the execution sequence counter j (Step S104), the following Steps S105 to S116 are repeated until no machining step unit program exist, i.e., until the machining sequence counter j exceeds the internal variables NG15 and NG16. If the machining step unit programs exist in the machining step location data EXE (j, 3) of the third control process in the execution sequence counter j (Step S106), the machining step unit programs are copied from the machining program PRO before the conversion and the copied portions will be the machining step unit programs PUT' (i) of the converted machining program PRO' (Step S107). The machining step unit programs PUT (i) in the machining step location data EXE (j, 3) are portions from the SEP (EXE (J, 3))-th block to the (SEP (EXE (j, 3) +1) −1)-th block of the machining program PRO before the conversion. Then, the control process commands TRC' (i) in the machining step unit programs PUT' (i) are specified as "G15", and the synchronization commands SYN' (i) are set (Steps S108 and S109). When the machining step unit programs PUT' (i) are formed, the machining step number i is added with "1" (Step S110).

Similarly, if the machining step unit programs exist in the machining step location data EXE (j, 4) of the fourth control process in the execution sequence counter j (Step S111), the machining step unit programs are copied from the machining program PRO before the conversion and the copied portions will be the machining step unit programs PUT' (i) of the converted machining program PRO' (Step S112). The machining step unit programs PUT (i) in the machining step location data EXE (j, 4) are portions from the SEP (EXE (j, 4))-th block to the (SEP (EXE (j, 4) +1) −1)-th block of the machining program PRO before the conversion. Then, the control process commands TRC' (i) in the machining step unit programs PUT' (i) are specified as "G16", and the synchronization commands SYN' (i) are set (Steps S113 and 114). When the machining step unit programs PUT' (i) are formed, the machining step number i is added with "1" (Step S116). When there is no machining step unit program (Step S105), the entire processing has been completed.

As described above, with the numerical control apparatus having a machining program editing function of numerical control machine tools according to the present invention, in which the sequence of the execution of a machining program can be converted only by changing the locations of symbolized machining steps (machining step names), editing operations can be carried out on one page on a screen even for a machining program having a number of blocks, and thus the efficiency of editing operations can be greatly improved. In the numerical control machine tools having a plurality of headstocks or a plurality of tool rests, since control process definition commands and synchronization commands can be automatically changed, the work load to operators can be greatly reduced and, in addition, even unskilled operators can easily change the sequence of the execution of a machining program. Further, since there is no need for correcting characters and numerical values by directly inputting them, input errors can be greatly reduced.

It should be understood that the foregoing description is only illustrative of the invention. Various alternatives and modifications can be devised by those skilled in the art without departing from the present invention. Accordingly, the present invention is intended to embrace all such alternatives, modifications, and variances which fall within the scope of the appended claims.

What is claimed is:

1. A numerical control apparatus having a machining program editing function of a machining program for controlling a numerical control machine tool, which comprises:

an input means for inputting machining step division codes and machining step identification codes;

a definition means for defining machining step unit programs by dividing the machining program on the basis of machining step division blocks, as the machining step division blocks which use blocks in positions separated, by a specified number of blocks, from the blocks in which the machining step divisions codes are commanded;

a means for extracting the machining step identification codes for each of the machining step unit programs and defining the extracted machining step identification codes as the machining step names of the machining step unit programs;

a display means for arranging the machining step names on a screen according to the sequence of the execution of the machining step unit programs;

a changing means for changing the locations of the machining step names according to commands input from outside; and a converting means for converting the sequence of the execution of the machining programs according to the locations of the machining step names thus changed.

2. A numerical control apparatus having a machining program editing function according to claim 1, wherein the machining step division codes can be selected from tool change commands, spindle rotation speed commands, control process definition commands, comment statements and labels.

3. A numerical control apparatus having a machining program editing function according to claim 1, wherein said machining step identification codes can be selected from tool change commands, spindle rotation speed commands, control process definition commands, comment statements and labels.

4. A numerical control apparatus having a machining program editing function according to claim 1, wherein, in the case of numerical control machine tools having a plurality of control processes, said changing means arranges the machining step names after classifying them according to control processed by identifying the control process in which each machining step unit program is executed.

* * * * *